M. B. RYAN.
MACHINE FOR MANUFACTURING WELDED WIRE CHAINS.
APPLICATION FILED MAR. 29, 1911. RENEWED OCT. 22, 1912.

1,123,599.

Patented Jan. 5, 1915.

5 SHEETS—SHEET 1.

WITNESSES:

INVENTOR
M. B. Ryan
BY
ATTORNEY

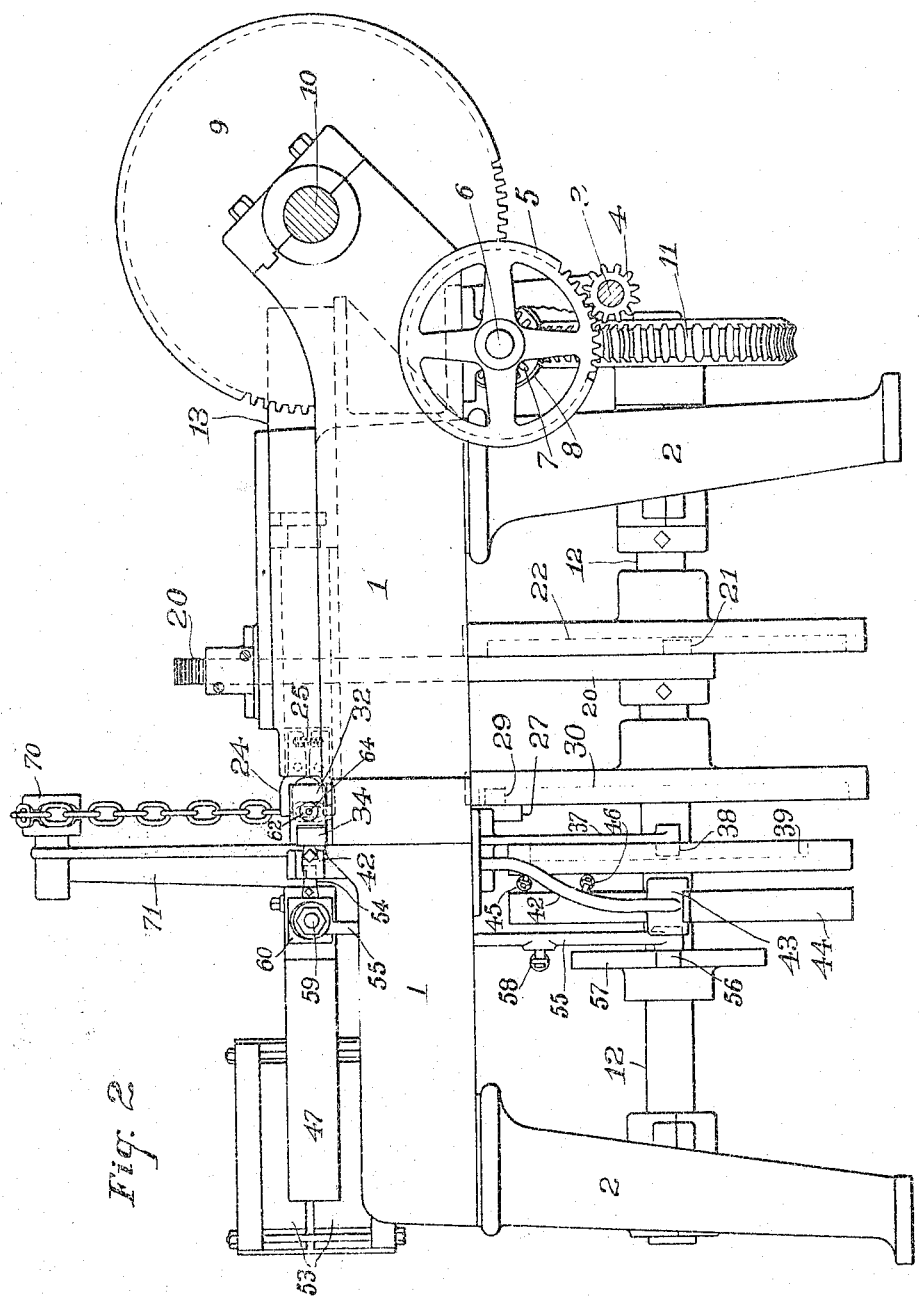

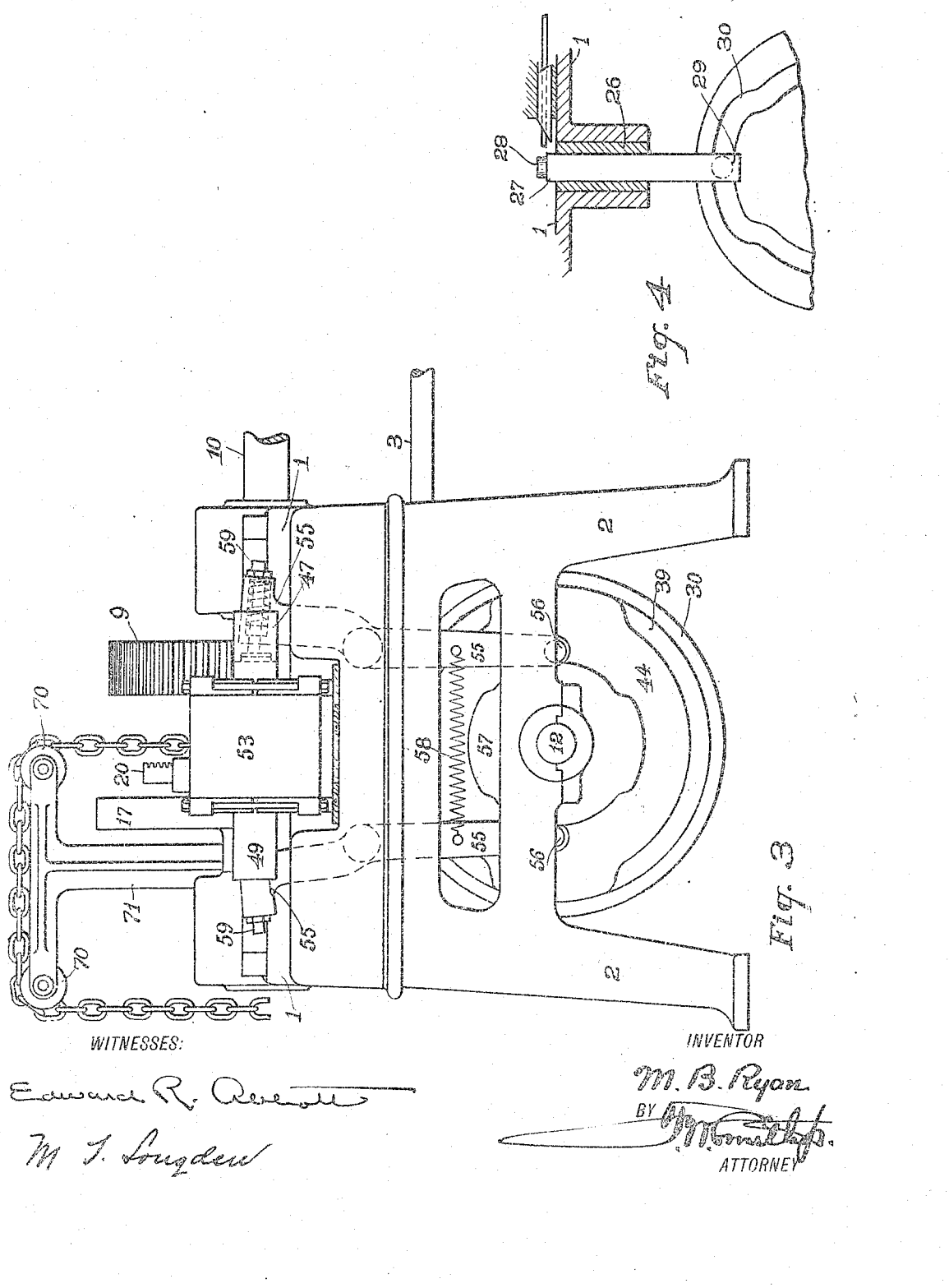

M. B. RYAN.
MACHINE FOR MANUFACTURING WELDED WIRE CHAINS.
APPLICATION FILED MAR. 29, 1911. RENEWED OCT. 22, 1912.
1,123,599.
Patented Jan. 5, 1915.
5 SHEETS—SHEET 5.
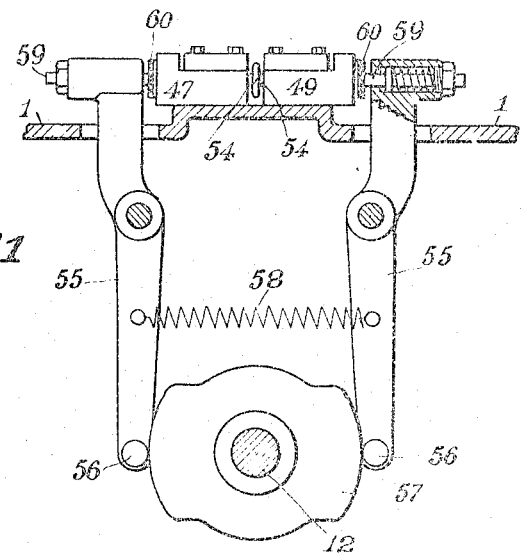
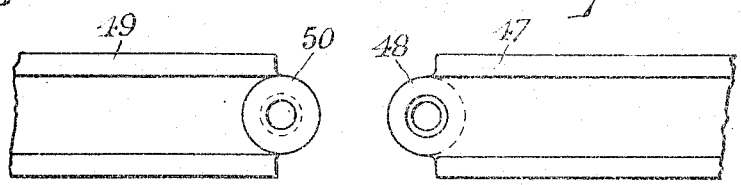
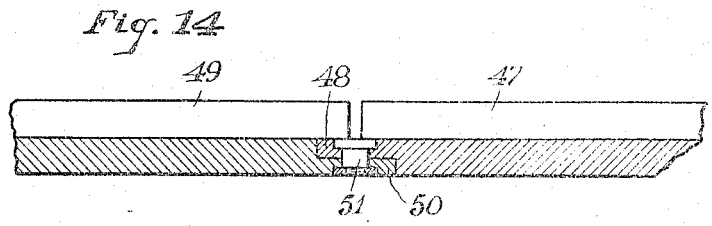
WITNESSES:
INVENTOR
M. B. Ryan
BY
ATTORNEY

UNITED STATES PATENT OFFICE.

MICHAEL B. RYAN, OF BRIDGEPORT, CONNECTICUT.

MACHINE FOR MANUFACTURING WELDED WIRE CHAINS.

1,123,599.  Specification of Letters Patent.  Patented Jan. 5, 1915.

Application filed March 29, 1911. Serial No. 617,600. Renewed October 22, 1512. Serial No. 727,110.

*To all whom it may concern:*

Be it known that I, MICHAEL B. RYAN, a citizen of the United States, residing in the city of Bridgeport, county of Fairfield, State of Connecticut, have invented certain new and useful Improvements in Machines for Manufacturing Welded Wire Chains; and I do declare the following to be a full, clear, and exact description of the invention, such as will enable others skilled in the art to which it appertains to make and use the same.

My invention relates to machines for manufacturing welded wire chains, rings, and the like, in which the welding is preferably performed by electricity and the various operations are carried out automatically, the machine taking the wire from the coil or rod and delivering the completed chain or the like which then only needs the usual tumbling to remove the scale, cuttings, fins, &c.

A further object of my invention is to completely remove the surplus metal incident to the welding and to force the parts of the welded joint more closely together so that the link at the welding location will not only be as strong as any other part of the link but will not be characterized by the roughness or unsymmetrical appearance commonly displayed by welded chain.

With these ends in view my invention consists in the novel features of construction and arrangement of parts such as will be hereinafter fully described and then particularly pointed out in the claims which conclude this description.

Figure 1:
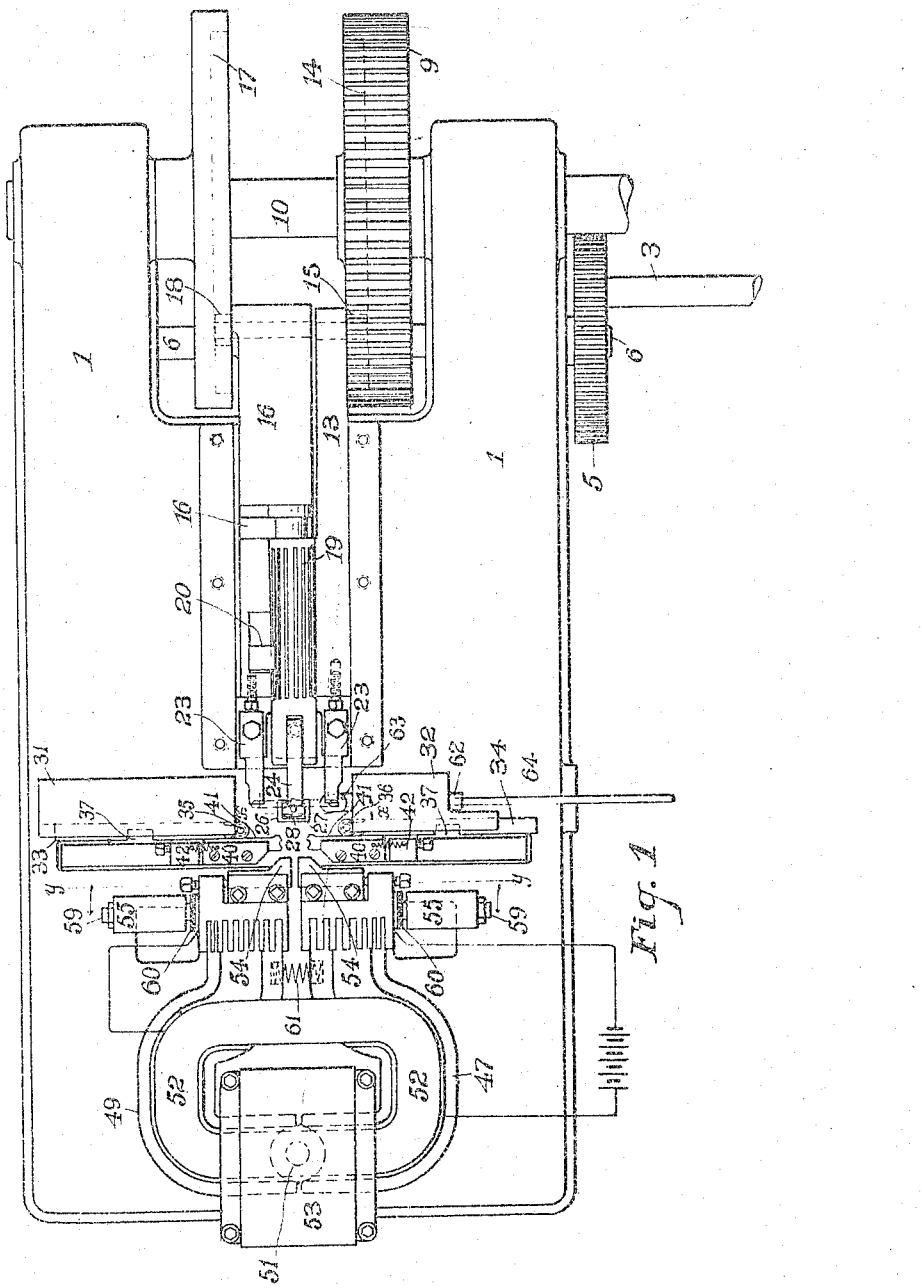

In the accompanying drawing Figure 1 is a plan view of my improved machine—Fig. 2 a side elevation thereof—Fig. 3 an end view—Fig. 4 a detail broken sectional elevation at the line $x$, $x$, of Fig. 1—Figs. 5, 6, 7, 8, 9, and 10 are detail broken plan views showing the position of the several instrumentalities immediately associated with the wire in performing the several operations in the manufacture of the link, constructing a partially formed link, and delivering the link to the welding and pressure members—
Fig. 11 a section at the line $y$, $y$, of Fig. 1—Figs. 12 and 13 are broken plan views of the respective sections of the secondary as they appear prior to their final assembly and hinging, and Fig. 14 is a detail broken sectional elevation showing the hinged secondary sections.

Similar numerals of reference denote like parts in the several figures of the drawing.

In machines of this description as hitherto made, the arrangement of the mechanism was such that the last formed link or links were not easily visible, and any difference in them would not be observed until several more links had been added to the chain.

According to the present invention the wire is severed at an angle of about 60° for a joint at the side of the link, and means are provided whereby the chain is carried out link by link into a position where the links are visible as fast as they are completed without any special exertion on the part of the operator, and the latter can readily see by the appearance of a newly formed link whether the current is correctly timed and adjusted. Means are provided whereby the movement of a link from the electrodes to the presser forming tools is reduced to a minimum both as regards distance of movement and time occupied, so that the final forming pressure is applied before any detrimental cooling of the wire can take place.

1 is any suitable table or bed supported upon legs 2, and 3 is the power shaft transversely journaled in suitable bearings beneath said bed and carrying a pinion 4 which meshes with a spur 5 carried on a transversely journaled shaft 6 which latter carries a pinion 7 and worm 8. The pinion 7 meshes with a large spur gear 9 carried by a shaft 10 journaled at the rear of the bed 1 while the worm 8 meshes with a worm wheel 11 carried by a shaft 12 journaled within bearings beneath the bed and extending lengthwise thereof, or, in other words, at right angles to the shafts heretofore mentioned. From the above it will be readily understood that the power shaft will communicate rotation to the shaft 6 while the latter will be instrumental in revolving the shafts 10, 12.

13 is a main slide guided within suitable ways in the bed and actuated by means of a groove cam 14 in face of gear 9 within which cam tracks a roll 15 carried by the rear of said slide. Guided within ways in the slide 13 is a secondary slide 16 which is actuated by means of a groove cam 17 on the shaft 10 within which cam tracks a roll 18 extending from the rear of the slide 16, and suitably journaled to the slide 16 so as to partake of the sliding movements thereof is an elongated pinion 19 which is capable of independent rotation.

20 is a vertically disposed rack bar guided within suitable ways so as to slide freely and having extending from its lower extremity a roll 21 (shown in dotted lines) which tracks within a groove cam 22 carried by the shaft 12, which rack bar meshes with the pinion 19 and by its operation from the cam 22 will cause said pinion to revolve a quarter turn for the purpose presently to be explained.

23 are the tools which perform the first bending operation and which are secured to the forward end of the main slide 13 in properly spaced condition, and pivoted within the forward extremity of the pinion element 19 are gripper jaws 24 properly spaced at their nose ends in normal condition so as to engage the links, and having their rear extremities distended by means of spring 25 (shown in dotted lines) the function of this spring being merely to enable the jaws to open with a resilient closing action so that they will firmly grip the links and also can be readily withdrawn therefrom when the occasion demands.

Guided within a suitable bushing 26 in the bed of the machine immediately beyond the pinion element 19 is a vertically disposed bar 27 carrying on its upper extremity a mandrel 28 around which the link bending operations are performed, the lower extremity of this bar having a roll 29 (shown in dotted lines) extending therefrom and tracking within a groove cam 30, as more particularly shown at Fig. 4.

31, 32, are blocks secured to the bed of the machine and 33, 34, are slides suitably guided within these blocks and provided at their inner extremities with rolls 35, 36, which slides and rolls are the elements which perform the bending operations subsequent to the initial bending by the tools 23. These slides are actuated by means of levers 37 pivoted beneath the bed plate and carrying at their lower extremities rolls 38 (shown in dotted lines) which track within groove cam 39 carried by shaft 12, the upper extremities of these levers being loosely connected with said slides. This last described construction is so common that I have not specially illustrated the same and therefore only one of the levers 37 appears in connection with the cam 39, but it will be readily understood that these levers are duplicates and are engaged within this cam at diametrically opposite points.

40 are slides suitably guided in the bed and carrying the presser tools 41, said slides being actuated by means of levers 42 pivoted below the bed of the machine and having at their lower extremities shoes 43 which engage diametrically opposite portions of periphery cam 44, the upper extremities of these levers being suitably engaged with the slides 40.

45, 46, are coil springs which connect the levers 42 below their pivotal point and serve to keep the shoes 43 in firm contact with the cam 44, and likewise cause the slides 40 to spread apart when said shoes are against the reduced portions of said cam.

The construction last described is quite ordinary and I have likewise not seen fit to make any special illustration thereof, and therefore only a single one of the levers 42 appears in the drawing, but it may be stated that the construction is generally like that shown at Fig. 11 which illustrates the means employed to operate the welding electrodes.

Referring to the welding instrumentalities, the "secondary" is made in two sections each of which is composed of a trough-like piece of copper having offset hinge portions one of these sections 47 with its offset hinge portion 48 being shown at Fig. 12 while the other section 49 with its offset hinge portion 50 is shown at Fig. 13, while at Fig. 14 these sections are shown properly assembled and pivoted or hinged together by means of pin 51.

52 is the usual primary seated within the secondary sections and 53 is the soft iron core surrounding the primary and secondary, said core and secondary being properly insulated from the rest of the machine in any suitable manner.

The welding electrodes 54 are secured to the inner extremities of the respective secondary sections 47, 49.

55 are levers pivoted below the bed of the machine and carrying at their lower extremities rolls 56 which bear against a cam 57 carried by the shaft 12, said rolls being kept in firm contact with this cam by means of coil spring 58 having its extremities secured to said levers below the pivotal points thereof. Within the upper extremities of these levers are resilient plunger pins 59 which bear against the insulator blocks 60 secured to the sides of the sections 47, 49, so that when the cam acts to force the electrodes toward each other against an interposed link there will be a yielding pressure which produces excellent results, since a dead pressure during a welding operation does not permit of a proper fusing and distribution of the metal at the point of welding, and a pressure that greatly increases from a minimum to a maximum during the welding operation will result in a thorough and uniform welding. When the rolls 56 are against the low points of the cam 57 so as to permit the spreading of the electrodes such spreading may be effected by means of a coil spring 61 interposed between the secondary sections 47, 49, but of course it will be readily understood that these sections may be returned to normal position in any suitable and ordinary manner.

62 is a quill secured within the block 32 and projecting therefrom at the ends and beveled at its inner extremity as indicated at 63, so that when the wire 64 is fed through this quill for the purpose of cutting off blanks said wire will be sheared at an angle so that the extremities of a blank will properly overlap, the actual feeding of the wire being accomplished in any well known manner while the under surface of the tool 23 is formed into a cutter to shear off the wire.

Figure 6:
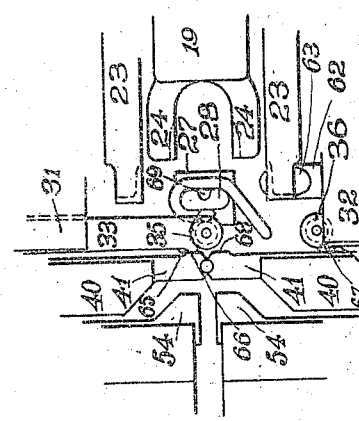
Figure 5:
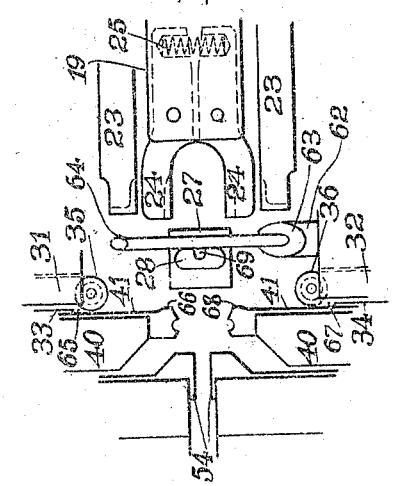

Referring more particularly to Figs. 5 to 10 inclusive the operation of my improvement is as follows:—After the wire has been fed forward to a sufficient extent immediately behind the mandrel 28, the primary bending tools 23 advance thereby cutting off the wire and bending the blank thus formed into a general U-shape, whereupon the bending slide 33 advances and bends one end of the blank around and against the mandrel, as shown at Fig. 6. At the end of the stroke of this slide 33 a cam surface 65 carried thereby will engage a corresponding cam surface 66 carried by one of the presser tools 41, which latter have meanwhile been brought together prior to the operation of the slide 33, and the engagement of these cam surfaces will cause the roll 35 to firmly and violently pinch the extremity of the blank acted on against the mandrel and thereby "set" this end; this slide 33 is then retracted and the slide 34 advances to perform a similar bending operation upon the other extremity of the blank, and at the final stroke of this slide a cam surface 67 carried thereby will coöperate with a cam surface 68 carried by the other presser tool 41 and thereby firmly and violently "set" the remaining extremity of the link blank inwardly against the mandrel, the result of these two setting operations being that the overlapping extremities of the link blank will be so completely and uniformly "set" that the link at its divided portion will present no irregularities or projections whatsoever.

In forming a link for lap welding, considerable difficulty has been experienced because the ends of the link blank at the joint were not properly "set", and almost invariably the joint would present projecting portions, so that when such a joint was delivered between the welding terminals some parts would be brought to a welding heat quicker than others, and since the welding is automatically controlled, some portions of the joint would necessarily be overheated or underheated, thus rendering the chain unreliable as to tensile strength and unsightly as to appearance.

Figure 7:
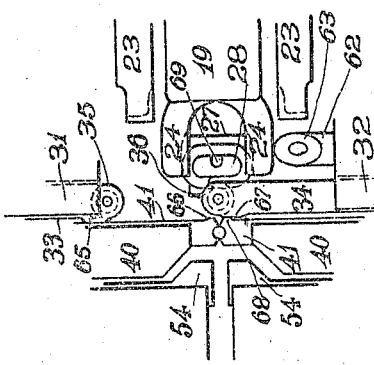
Figure 10:
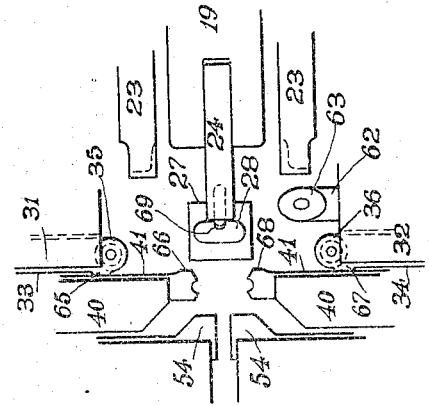
Figure 9:
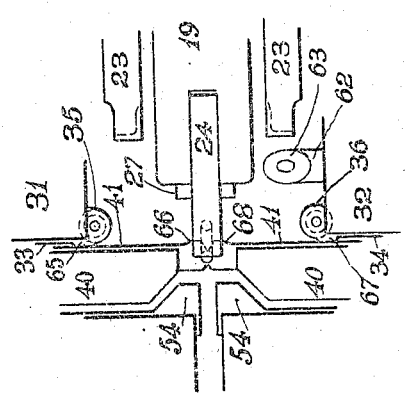
Figure 8:
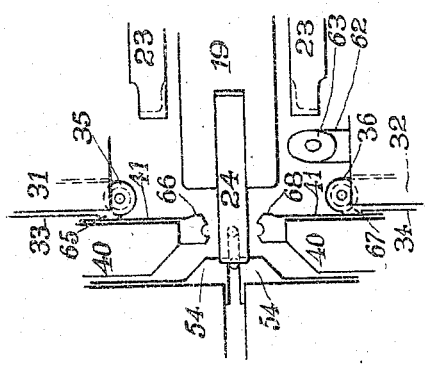

In my present improvement, the coöperation of the cam surfaces in succession as each end of the blank is bent around the mandrel, "oversets" each end uniformly so that the natural resiliency of the stock will cause the peripheries of these ends throughout their overlapping portions to coincide so as to become in cross section complementary parts of a circle, it being of course assumed that round wire is used in the manufacture of the chain, and it will be readily understood, that, when a joint of this sort is presented for welding, all portions of said joint must necessarily be heated uniformly since the diameter of such joint is the same in all directions, and therefore the welding operation will not only be perfect but can be automatically controlled. This "setting" operation is highly important, since it is far superior to a "setting" operation performed at one time against the overlapping ends of the blank. The gripper jaws 24 will now be advanced so as to engage and hold the link as shown at Fig. 7. and after the slide 34 and presser tools 41 have been retracted, and the mandrel 28 withdrawn from the link, these gripper jaws will be advanced by the action of the slide 16 and will be given a quarter turn by the action of the rack 20 against the pinion 19, and the overlapping ends of the link will be presented between the welding electrodes 54, as shown at Fig. 8; after the welding operation, the slide 16 will be operated to slightly retract the jaws 24 and the welded ends will be presented between the presser tools 41 which latter will be operated to firmly compress and form the comparatively soft metal so that in the finished link the welded joint will be smooth and will present no irregularities as compared with the rest of the link; after the spreading of the tools 41, the action of the slide 16 will cause the jaws 24 to be retracted to a position where the completed link is held by these jaws in position to receive the wire for the blank of a succeeding link, as shown at Fig. 10, and the mandrel 28 will now be elevated so that a notch 69 therein will engage the completed link, whereby the wire for a succeeding blank may be disposed closely around the mandrel. As fast as the chain is made it is led up over suitable pulleys 70 supported by a T-upright 71 rising from the bed of the machine, and thence passed to any suitable receptacle.

It has been found in practice that when a wire blank is forced sharply around a mandrel by a U-tool or the equivalent, the force required is so great that the tool bruises the metal so much that sometimes the strength of the chain is greatly decreased, but it will be observed that I have done away entirely with any U-tool or the equivalent and that I form an initial bend at the ends of the blank so as to bring these ends within the field of operation of the laterally disposed bending slides, so that it will be clear that there can be no bruising whatever of the metal. Also, in machines for making welded wire chain as hitherto constructed, considerable trouble has been caused by scales or loose slivers attached to the severed ends of the wire blank, since both the welding electrodes and the final pressure tools have been disposed in horizontal planes, and said scales or slivers would therefore rest on the lower electrode and get welded to or set on the soft copper points and accordingly interfere very much with the electric current. This necessitates the stopping of the machine in order to locate the sliver and knock it off with a chisel or other suitable tool, and so annoying is this defect that a careless operator will frequently allow the machine to run to the detriment of the chain in the expectation that the sliver will burn off or get dragged out with the link. In my improvement the welding electrodes as well as the final pressure tools are set perpendicularly so that the loose slivers will drop by gravity and will not become lodged in these devices.

The machine constructed as shown and described is exceedingly advantageous for manufacturing welded chain from rod material or wire, because the "setting" of the ends is so perfect throughout the entire overlapping portions, that a considerable surface is subjected to the welding operation without marring the symmetry of the chain, particularly after the presser tools have performed their operations.

The method of forming and welding, which is disclosed in this application, is not claimed herein but is the subject of a separate application for patent about to be filed by me.

Having thus described my invention what I claim as new and desire to secure by Letters Patent is:—

1. In a machine of the character described, the combination of a vertically reciprocating mandrel, means for bending the blank into the shape of the article desired with the ends overlapping, welding devices, presser formers, means for "setting" the ends of the article prior to welding, an independent slidable and rotary element, a pair of resilient gripper jaws pivoted within the forward extremity of said element, means for advancing said element whereby said jaws will grasp the completely formed article while it is still around said mandrel, means for withdrawing the mandrel, means for projecting said element and means for revolving the same whereby said article held by said jaws is presented to the welding devices, and means for retracting said element whereby said article is presented to the presser formers.

2. In a machine for automatically making welded wire chains, the combination of welding devices and means for operating them, and presser formers that receive and shape a completed welded link, with a vertically reciprocatory mandrel, means for effecting the several bending operations whereby the link is formed around said mandrel, means carried by the final bending tools and coöperating with means carried by said presser formers whereby the extremities of the link are finally "set" while the link is around the mandrel, an independent slidable and rotary element, a pair of resilient gripper jaws pivoted within the forward extremity of said element, means for advancing said element whereby said jaws will grasp a completely formed link while it is still around said mandrel, means for withdrawing the mandrel, means for projecting said element and means for revolving the same whereby the link held by said jaws is presented to the welding devices, and means for retracting said element whereby said link is presented to the presser formers and subsequently held in a position to receive the blank for a succeeding link.

3. In a chain making machine, the combination of a vertically reciprocating mandrel, primary and secondary reciprocating bending means operating in horizontal planes at right angles to each other, means for delivering a blank in position for the primary bending, mechanism for advancing the primary bending means whereby the blank is bent into substantially U-shape, means for operating the secondary bending means whereby the ends of the blank are successively bent around the mandrel with their ends overlapping, welding devices, presser formers provided with cam surfaces which engage corresponding surfaces on the secondary bending means whereby the extremities of the link blank are successively "set," an independent slidable and rotary element, a pair of resilient gripper jaws pivoted within the forward extremity of said element, means for advancing said element whereby said jaws will grasp a completely formed link while it is still around said mandrel, means for withdrawing the mandrel, means for projecting said element and means for revolving the same whereby the link held by said jaws is presented to the welding devices, and means for retracting said element whereby said link is presented to the presser formers and subsequently held in a position to receive the blank for a succeeding link.

4. In a chain making machine, the combination of a mandrel, means for bending a link blank against said mandrel into a substantially U-shape, roll-carrying slides movable parallel to the side of the link to be welded, slides movable parallel to said first mentioned slides and carrying shaping dies, and cams on said last mentioned slides for forcing said rollers toward said mandrel.

5. In a chain making machine, the combination of a mandrel, welding devices having their operating surfaces positioned in planes at an angle to the plane of the bending faces of said mandrel, means for feeding a blank to said mandrel, primary means for bending said blank into substantially U-shape against said mandrel, secondary bending means operating in a plane at substantially right angles to said first bending means and arranged to engage said U-shaped blank to bend the ends thereof around the mandrel and to substantially join said ends, presser means having its operating surfaces located in a substantially coincident plane with those of said welding devices, means for gripping the link formed on the mandrel, means for moving said mandrel from the plane of said link, means for moving said link gripping means to turn the formed link and to position it in the plane of and in operative relation to said welding means, and for subsequently moving said gripping means with the welded link into the plane of and in operative relation to said presser means.

6. In a chain making machine, the combination of a vertically movable mandrel, welding devices having their operating surfaces positioned in substantially vertical planes, presser means having its operating surfaces positioned in substantially vertical planes, means for feeding a blank to said mandrel, primary means for bending said blank against said mandrel and into substantially U-shape, secondarily operable bending means operating in a plane at substantial right angles to said primary bending means and arranged to engage said U-shaped blank to bend the ends thereof around the mandrel and to substantially join said ends, means for gripping the link formed on said mandrel, means for subsequently moving said mandrel from the plane of said link, and means for moving said link gripping means to turn the formed link and position the latter in the plane of and in operative relation to the operating surface of said welding means and for subsequently moving said gripping means with the welded link into the plane of and in operative relation to the operating surfaces of said presser means.

7. In a chain making machine, the combination of a vertically movable mandrel, welding devices having their operating surfaces positioned in substantially vertical planes, presser means having its operating surfaces positioned in substantially vertical planes, means for feeding a blank to said mandrel, primary means for bending said blank against said mandrel and into substantially U-shape, secondarily operable bending means operating in a plane at substantial right angles to said primary bending means and arranged to engage said U-shaped blank to bend the ends thereof around the mandrel and to substantially join said ends, means for gripping the link formed on said mandrel, means for subsequently moving said mandrel from the plane of said link, and means for moving said link gripping means to turn the formed link and position the latter in the plane of and in operative relation to the operating surfaces of said welding means and for subsequently moving said gripping means with the welded link into the plane of and in operative relation to the operating surfaces of said presser means, said last named means being so arranged to subsequently and further move said gripping means and said formed link into a position whereby the fed blank of the next formed link of the chain may be threaded therethrough.

8. In a chain making machine, the combination of a movable mandrel, welding devices having their operating surfaces positioned in planes at an angle to the bending faces of said mandrel, presser means having its operating surfaces located in a substantially coincident plane with said surfaces of said welding devices, means for feeding chain link stock to said mandrel, means for cutting said stock to length, primary bending means arranged to bend said cut length against said mandrel and to substantially U-shape, secondarily operated bending means operating in a plane at substantially right angles to said primary bending means and arranged to engage said U-shaped blank to bend the ends thereof around said mandrel and to substantially join said ends, means for gripping the link thus formed while upon said mandrel, means for subsequently moving said mandrel from the plane of said link, means for moving said gripping means to turn said link and to position the same in the plane of and in operative relation to said operating surfaces of the welding devices, and to subsequently move said gripping means and the welded link carried thereby to bring said link first into operative relation to said presser means, and thence to position the welded and pressed link whereby the fed end of the next succeeding length of stock may be threaded therethrough.

9. In a chain making machine, the combination of a vertically movable mandrel having bending surfaces extending in a substantially horizontal plane, welding devices having their operating surfaces positioned in substantially vertical planes, presser means having its operating surfaces positioned in substantially vertical planes, means for feeding chain link stock to said mandrel, means for cutting said stock to length, primary means for bending said cut length against said mandrel and into substantially U-shape, secondarily operating means movable and operating in a plane at substantially right angles to said primary bending means and arranged to bend said U-shaped link around said mandrel to substantially join the ends thereof, means for gripping the link bent around said mandrel while on said mandrel, means for subsequently moving said mandrel from the plane of said link, means for moving said gripping means and the link carried thereby and for turning said link to position the same in the plane of and in operative relation to the operating surfaces of said welding devices, and for subsequently moving said gripping means and said link into the plane of and in operative relation to the operating surfaces of said presser means, said last named moving means being also operative to subsequently position the welded and pressed link whereby the fed end of the next succeeding length of stock may be threaded therethrough.

10. In a chain making machine, a mandrel, means for bending a length of link stock with complemental beveled ends about said mandrel, said bending means including means whereby the beveled ends of said bent link are given a final pressure to spring them beyond each other whereby said ends may spring back into substantial alinement when said final pressure is removed.

11. In a chain making machine, the combination of a mandrel, means for feeding link stock to said mandrel, means for cutting said stock to length to provide the same with complemental beveled ends, means for bending said cut length about said mandrel, said bending means including means whereby the ends of said cut length are given a final pressure to spring them beyond each other whereby said ends may spring back into substantial alinement when said final pressure is removed.

In testimony whereof I affix my signature in presence of two witnesses.

MICHAEL B. RYAN.

Witnesses:
F. W. SMITH, Jr.,
M. T. LONGDEN.